United States Patent [19]

Neil

[11] Patent Number: 4,558,222

[45] Date of Patent: Dec. 10, 1985

[54] INFRARED RADIATION DETECTING SYSTEMS

[75] Inventor: Iain A. Neil, Strathblane, Scotland

[73] Assignee: Barr & Stroud Limited, Glasgow, Scotland

[21] Appl. No.: 542,252

[22] Filed: Oct. 12, 1983

[30] Foreign Application Priority Data

Nov. 6, 1982 [GB] United Kingdom ............... 8231750

[51] Int. Cl.$^4$ .............................................. G01J 5/08
[52] U.S. Cl. ................................... 250/353; 250/330; 250/332; 350/1.3
[58] Field of Search ............... 350/1.3, 473, 1.2, 453, 350/412; 250/353, 332, 330, 338 R

[56] References Cited

U.S. PATENT DOCUMENTS

| | | | |
|---|---|---|---|
| 3,915,547 | 10/1975 | Scidmore et al. | 350/1.3 |
| 4,383,173 | 5/1983 | Neil et al. | 250/330 |
| 4,507,551 | 3/1985 | Howard et al. | 250/216 |

FOREIGN PATENT DOCUMENTS 881337  4/1943  France ................. 350/453

*Primary Examiner*—Alfred E. Smith
*Assistant Examiner*—Constantine Hannaher
*Attorney, Agent, or Firm*—Mason, Fenwick & Lawrence

[57] ABSTRACT

An infrared radiation detecting system comprises an optical imaging system (25) for receiving radiation from a field of view (23) and delivering that radiation to an image surface (16). A background limited detector unit (26) having a detecting surface ($\phi$) located in a cold shield housing having a cooled aperture (13) is spaced from image surface (16) and a transfer lens system (24) is interposed to transfer infrared radiation therebetween. Lens system (24) is arranged to focus the radiation at the detecting surface ($\phi$) of the detector unit (26) such that the focussed radiation field curvature coincides with the physical curvature of detecting surface ($\phi$), to form a pupil which is coincident in space with the position of the cooled aperture (13) and to dimension the pupil to match the dimension of the cooled aperture (13). To achieve these effects the transfer lens system (24) is formed by four lens elements (A,B,C,D) of selected power, axial spacing, and refractive surface curvature.

5 Claims, 2 Drawing Figures

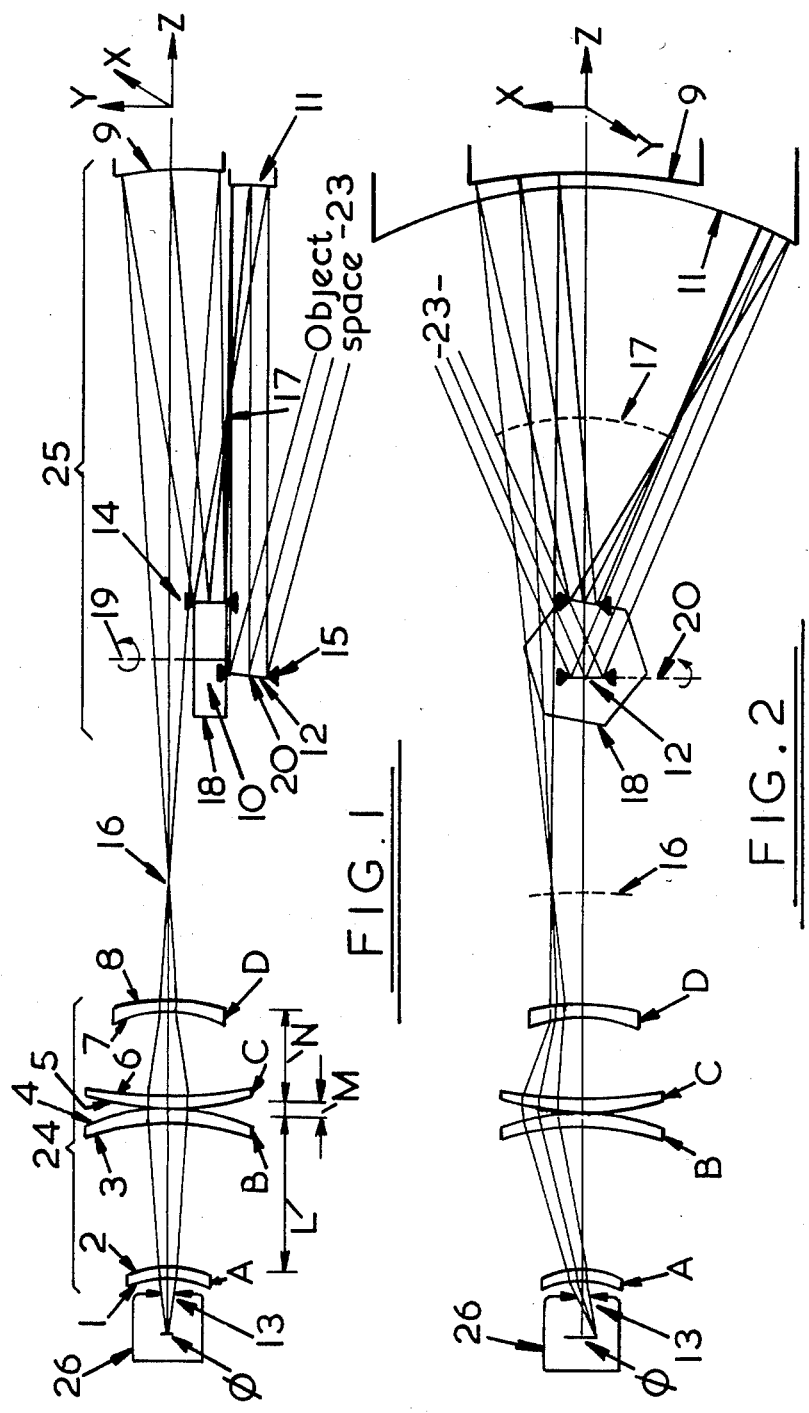

INFRARED RADIATION DETECTING SYSTEMS

This invention relates to infrared radiation detecting systems.

The continuing improvements to infrared radiation detector units such as arise from arranging the detector element or elements in a cold-shield housing having a cooled aperture whereby the radiation acceptance angle is limited and the detector unit is referred to as 'background limited' and such as arise from the increased sensitivity of individual detector elements and the use of large area detecting surfaces either formed by an array of detector elements or by a single detector element impose a requirement for a high-performance optical system to deliver the radiation to the detector unit.

Accordingly, it is an object of the present invention to provide an improved form of infrared radiation detecting system.

According to the present invention there is provided an infrared radiation detecting system comprising an optical imaging system for receiving radiation from a field of view and delivering said radiation to an image surface, a detector unit having a detecting surface formed by one or more detector elements located in a cold-shield housing having a cooled aperture which limits the radiation acceptance angle of the detector unit whereby the detector unit is background limited, and a transfer lens system intermediate said image surface and said detector unit for transferring infrared radiation therebetween and focussing the transferred radiation at the detecting surface of said detector unit, wherein said transfer lens system is composed of four lens elements that one of the lens elements adjacent said image surface being negatively powered and the other three of said lens elements being positively powered, the relative powers of said four lens elements being selected with respect to the curvature of said image surface to provide a field curvature of radiation focussed at the detecting surface coincident with the physical curvature of said detecting surface, and the respective axial dimensions of the air space between the two lens elements proximal the image surface and between the two lens elements proximal the detecting surface being substantially greater than that of the remaining air space of the transfer lens system, said axial dimensions being selected to locate the pupil formed by the transfer lens system coincident with said cooled aperture, the overall power of the transfer lens system being selected to dimension the pupil formed by the transfer lens system to match the dimension of the cooled aperture and the curvature of the refractive surfaces of said lens elements being selected to provide low field and pupil aberrations.

Preferably the centre thickness of each lens element of the transfer lens system is small whereby radiation transmission is maximised and lens element material used is minimised. Preferably also the axial air space between the two central lens elements of the transfer lens system is substantially zero whereby the transfer lens system is rendered relatively compact.

Conveniently, the refractive surfaces of the lens elements are each spherical (within the meaning in the art) so that manufacture of these elements is optically and mechanically simple.

Conveniently field curvature changes are achieved by selection of the thickness of the individual lens elements and/or the material from which the lens elements are manufactured although where more than one material is used in the transfer lens system it may be necessary to compensate for chromatic aberrations introduced.

An embodiment of the present invention will now be described by way of example with reference to the accompanying drawing, in which:

FIG. 1 is a side elevational view of an infrared detecting system according to the present invention; and FIG. 2 is a plan view of the FIG. 1 system.

The infrared detecting system illustrated in the drawing comprises an imaging system 25 which receives radiation from object space 23 and delivers the received radiation to an image surface 16. A transfer lens system 24 collects the radiation at surface 16 and transfers it to a detector unit 26. Unit 26 incorporates a detecting surface $\phi$ formed by one or more detector elements which are located within a cold-shield housing having a cooled aperture 13 which limits the radiation acceptance angle of the unit 26 whereby it is 'background limited'. The transfer lens system 24 is arranged as will be explained to focus the transferred radiation at the surface $\phi$ of unit 26 such that the field curvature of the radiation image is the same as the physical curvature of the surface $\phi$, and such that the radiation forms a pupil coincident in location and dimension with aperture 13.

The transfer lens system 24 is formed by four lens elements A,B,C,D aligned on a common optical axis and having respective spherical refractive surfaces 1 and 2, 3 and 4, 5 and 6, 7 and 8 which intersect the optical axis. Lens element A is adjacent the detector unit 26 and lens element D is adjacent the image surface 16. Lens elements A,B and C are each positively powered whereas lens element D is negatively powered and the relative powers are selected to provide for the field curvature of the radiation image formed in unit 26 being the same as the physical curvature of surface $\phi$. By selecting various different combinations of power values of the individual lens elements a variety of physical curvatures of surface $\phi$ can be matched irrespective of the field curvature of image surface 16 (which may vary depending upon the nature of the imaging system 25 as will be explained). The overall power of the system 24 is selected so that the dimension of the radiation pupil is identical to the dimension of the aperture 13.

The transfer lens system 24 is also arranged with an air space L separating elements A and B, an air space M separating elements B and C and an air space N separating elements C and D and in order to vary the position of the output pupil axially so that it is accurately located coincident with aperture 13 of unit 26 air spaces L and N are each made substantially greater than air space M. Indeed for compactness air space M is made substantially zero. With this arrangement the output pupil of the system 24 always lies between lens element A and unit 26 so that it is physically practical to have the pupil formed by the system 24 coincident with aperture 13. Location of the pupil formed by the system 24 is determined by the numeric value of air spaces L and N.

The imaging system 25 is only one form of appropriate imaging system which may be adopted with the transfer lens system 24 and the detector unit 26. By way of example the imaging systems could be line and frame scanning with or without magnification and achromatised or non-achromatised, objective lenses, multiple field of view telescopes or zoom telescopes in each of which image surface 16 is formed. The system 25 which is described merely by way of example comprises flap mirror 12 pivotal about axis 20 and which forms a pupil 15, spherical concave mirror 11 forming an intermediate image 17, mirror drum 18 rotatable about axis 19 and having planar facets 10 parallel to axis 19 and which forms a pupil 14, and spherical concave transfer mirror 9 which produces the image surface 16. System 25 is described in greater functional detail in U.K. Patent Specification No. 1586099.

One example of the transfer lens system 24 and the accompanying imaging system 25 is detailed in Table I wherein the radius of curvature and optical aperture of each optical surface is given relative to the detecting surface $\phi$. Thus, for example, surface 9 has a radius of curvature of $-236.09$ mm, the $-$ve sign indicating that the centre of curvature is to the left hand side of surface 9; the vertex of surface 9 is offset from the Z-axis by $-11.33$ mm in the Y-direction (indicated in FIG. 1), and is separated by an air space of 294.62 mm from the vertex of the preceding surface (in the direction of the datum) 8 in the Z-direction which is axial.

The system 24 produces a magnification of $\times 0.5$ and has an f-number of about 3 in the air space between surface $\phi$ and surface 1, with an f-number of about 6 in the air space between surface 8 and mirror surface 9. Specific values of image quality for the entire optical system are given in Table II.

The system 24 described with reference to Tables I and II provides low field and pupil aberrations and minimal distortion and is capable of use with a large area of surface $\phi$ with good imaging quality thereat and with an efficient detector stop at aperture 13.

The parameters of the system 24 can be varied in order to adjust the magnification factor within the range 0.3 to 3.0 whilst retaining the aforementioned resolution quality but the latter degrades unacceptably outside this magnification range. Of course the selected magnification factor is dependent upon the f-number of the detector unit 26 on the one hand and the f-number at the output of the imaging system 25 both of which require to be matched by the respectively adjoining portions of the system 24.

Although the example described operates in the 8-13 micron wavelength region by virtue of the materials used (i.e. Germanium), the system 24 may operate in any part of the 1-13 micron region by using other lens materials (e.g. Silicon); Germanium coated with ARG 3 coating—as marketed by Barr and Stroud Limited—the characteristics of which are high transmission (about 98% or greater); low reflectivity (about 0.2% or less); provides substantially zero narcissus effect for the 8-12 micron band which is particularly useful.

It is to be noted that the numerical data given herein is for a temperature of 20° C. and the f-number referred to is derived from the formula $(2 \sin \theta)^{-1}$ where $\theta$ is the half angle of the cone formed by the axial field pencil after refraction from the lens element on which it is incident.

TABLE I

| Element | Surface | Separation | Offset[1] | Radius of Curvature | Material | Aperture Diameter[2] X-axis direction | Y-axis direction |
|---|---|---|---|---|---|---|---|
| Detector | $\phi$ | 0 | 0 | Flat | Air | 7.5 | 1.0 |
| Pupil & Stop | 13 | 14.80 | 0 | Flat | Air | 4.9 | 4.9 |
| Lens A | 1 | 5.20 | 0 | $-40.00$ | Air | 10.1 | 6.7 |
|  | 2 | 4.00 | 0 | $-32.15$ | Ge | 11.2 | 7.6 |
| Lens B | 3 | 51.17 | 0 | $-92.80$ | Air | 41.5 | 13.4 |
|  | 4 | 5.00 | 0 | $-74.97$ | Ge | 43.8 | 14.0 |
| Lens C | 5 | 0.10 | 0 | 97.70 | Air | 44.8 | 14.2 |
|  | 6 | 5.00 | 0 | 266.25 | Ge | 45.1 | 14.5 |
| Lens D | 7 | 29.05 | 0 | $-47.24$ | Air | 23.1 | 5.4 |
|  | 8 | 4.00 | 0 | $-87.86$ | Ge | 23.7 | 5.6 |
| Mirror | 9 | 294.62 | $-11.33$ | $-236.09$ | Air | 81.7 | 36.4 |
| Rotor[3] Facet | 10 | $-152.27$ | $-3.31$ | Flat | Air | 23.0 | 12.0 |
| Pupil | 14 | 0 | $-0.0$ | Flat | Air | 11.2 | 11.2 |
| Mirror | 11 | 147.53 | $-7.64$ | $-159.24$ | Air | 149.3 | 14.2 |
| Flapping Mirror[4] | 12 | $-258.94$ | $-6.55$ | Flat | Air | 14.0 | 23.0 |
| Pupil | 15 | 0 | $-0.00$ | Flat | Air | 13.1 | 13.1 |

[1]Offset is measured cumulatively from Z-axis in the Y-axis direction.
[2]As required by a detector with dimensions of $\pm 3.75$ mm in the X-axis direction and $\pm 0.5$ mm the Y-axis direction for typical rotation angles at the rotor and flapping mirror.
[3]For rotor facet in a plane perpendicular to Z-axis.
[4]Data measured to the centre of the axis of rotation of the flapping mirror.

TABLE II

Appropriate R.M.S. Spot Sizes at the Detector Plane (in microns)

| Key | Detector Field (mm) | Rotor Angle (Degrees) | Monochromatic at 9.3 microns |
|---|---|---|---|
| A | 0 | 0 | 32.5 |
| B | $\pm 1.875$ | 0 | 37.2 |
| C | $\pm 3.750$ | 0 | 49.8 |
| D | $\pm 3.750$ | $\pm 9.46$ | 45.5 |
| E | $\pm 1.875$ | $\pm 7.78$ | 31.4 |
| F | 0 | $\pm 6.09$ | 33.6 |
| G | $\pm 1.875$ | $\pm 4.40$ | 42.2 |
| H | $\pm 3.750$ | $\pm 2.71$ | 53.4 |
| I | $\pm 3.750$ | $\pm 15.55$ | 49.3 |
| J | $\pm 1.875$ | $\pm 13.87$ | 28.5 |
| K | 0 | $\pm 12.18$ | 34.3 |
| L | $\pm 1.875$ | $\pm 10.49$ | 47.8 |
| M | $\pm 3.750$ | $\pm 8.81$ | 59.3 |

What is claimed is:

1. An infrared radiation detecting system comprising an optical imaging system for receiving radiation from a field of view and delivering said radiation to an image surface, a detector unit having a detecting surface formed by one or more detector elements located in a cold-shield housing having a cooled aperture which limits the radiation acceptance angle of the detector unit whereby the detector unit is background limited, and a transfer lens system intermediate said image surface and said detector unit for transferring infrared radiation therebetween and focussing the transferred radiation at the detecting surface of said detector unit, wherein said transfer lens system is composed of four lens elements that one of the lens elements adjacent said image surface being negatively powered and the other three of said lens elements being positively powered, the relative powers of said four lens elements being selected with respect to the curvature of said image surface to provide a field curvature of radiation focussed at the detecting surface coincident with the physical curvature of said detecting surface, and the respective axial dimensions of the air space between the two lens elements proximal the image surface and between the two lens elements proximal the detecting surface being substantially greater than that of the remaining air space of the transfer lens system, said axial dimensions being selected to locate the pupil formed by the transfer lens system coincident with said cooled aperture, the overall power of the transfer lens system being selected to dimension the pupil formed by the transfer lens system to match the dimension of the cooled aperture and the curvature of the refractive surfaces of said lens elements being selected to provide low field and pupil aberrations.

2. A system as claimed in claim 1, wherein the centre thickness of each lens element of the transfer lens system is small whereby radiation transmission is maximised and lens element material used is minimised.

3. A system as claimed in claim 1, wherein the axial air space between the two central lens elements of the transfer lens system is substantially zero whereby the transfer lens system is rendered relatively compact.

4. A system as claimed in claim 1, wherein the refractive surfaces of the lens elements are each spherical so that manufacture of these elements is optically and mechanically simple.

5. A system as claimed in claim 1, wherein field curvature changes are achieved by selection of the thickness of the individual lens elements and/or the material from which the lens elements are manufactured.

* * * * *